(12) United States Patent
Hirose et al.

(10) Patent No.: US 7,645,427 B2
(45) Date of Patent: Jan. 12, 2010

(54) HONEYCOMB STRUCTURE, MANUFACTURING METHOD OF THE STRUCTURE, AND EXHAUST GAS PURIFICATION SYSTEM USING THE STRUCTURE

(75) Inventors: Shogo Hirose, Nagoya (JP); Toshio Yamada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 521 days.

(21) Appl. No.: 10/667,339

(22) Filed: Sep. 23, 2003

(65) Prior Publication Data

US 2004/0071611 A1 Apr. 15, 2004

(30) Foreign Application Priority Data

Oct. 10, 2002 (JP) ............................. 2002-297711

(51) Int. Cl.
*F01N 3/022* (2006.01)
*F01N 3/023* (2006.01)
*F01N 3/24* (2006.01)

(52) U.S. Cl. ..................... 422/180; 422/173; 422/178; 55/523; 55/DIG. 30; 264/630; 264/631

(58) Field of Classification Search ...................... None
See application file for complete search history.

(56) References Cited

U.S. PATENT DOCUMENTS

| | | | | |
|---|---|---|---|---|
| 4,364,760 A | * | 12/1982 | Higuchi et al. | ................ 55/523 |
| 4,464,185 A | * | 8/1984 | Tomita et al. | ................ 55/310 |
| 5,566,545 A | | 10/1996 | Hijikata et al. | |
| 5,670,104 A | | 9/1997 | Miura et al. | |
| 5,758,496 A | * | 6/1998 | Rao et al. | ..................... 60/295 |
| 5,853,459 A | * | 12/1998 | Kuwamoto et al. | ........... 95/273 |
| 6,248,689 B1 | * | 6/2001 | Manson | ..................... 502/340 |
| 7,128,961 B2 | * | 10/2006 | Kai et al. | ..................... 428/116 |
| 2002/0050475 A1 | | 5/2002 | Maus | |

FOREIGN PATENT DOCUMENTS

| | | |
|---|---|---|
| DE | 37 44 020 A1 | 7/1989 |
| DE | 198 35 246 A1 | 2/2000 |
| EP | 1128031 A1 * | 8/2001 |
| EP | 1 132 587 A2 | 9/2001 |
| JP | A 59-199586 | 11/1984 |
| JP | A 60-112618 | 6/1985 |
| JP | U-60-112618 | 7/1985 |
| JP | A 62-75803 | 4/1987 |
| JP | A-07-256622 | 10/1995 |
| JP | A-08-012460 | 1/1996 |
| JP | A 8-28247 | 1/1996 |
| JP | A 2001-50028 | 2/2001 |
| WO | WO 9321429 A1 * | 10/1993 |

* cited by examiner

*Primary Examiner*—Jennifer A Leung
(74) *Attorney, Agent, or Firm*—Oliff & Berridge, PLC

(57) ABSTRACT

There is provided a honeycomb structure usable in a filter for trapping/collecting particulates included in exhaust gas and in which ashes deposited inside can be removed without requiring any special mechanism or apparatus or without detaching the filter from an exhaust system. The honeycomb structure includes: a plurality of through channels 9 separated by porous partition walls 7 and extending in the axial direction of the honeycomb structure; and plugging portions 11 for plugging one end of each of predetermined through channels 9*a* and an opposite end of each of the rest of through channels 9*b* in a checkered flag pattern, alternately. In the honeycomb structure, at least one slit 15 per through channel is formed in the vicinity of the plugging portions 11 of the partition walls 7 surrounding the respective through channels 9*b*.

20 Claims, 6 Drawing Sheets

HONEYCOMB STRUCTURE, MANUFACTURING METHOD OF THE STRUCTURE, AND EXHAUST GAS PURIFICATION SYSTEM USING THE STRUCTURE

BACKGROUND OF THE INVENTION

1. Field of the Invention

The present invention relates to a honeycomb structure for use in filters for trapping/collecting particulates in exhaust gas of an internal combustion engine, boiler, and the like, a method for manufacturing the honeycomb structure, and an exhaust gas purification system using the honeycomb structure.

2. Description of the Related Art

Since a large amount of particulates (particulate materials) of which major component is carbon is contained in the exhaust gas exhausted from internal combustion engines such as a diesel engine and such particulates become a cause for the environmental pollution, a filter for trapping/collecting the particulates is sometimes mounted for such internal combustion engines.

In general, as shown in FIG. 6, the filter for use in this purpose includes a plurality of through channels 9 separated by porous partition walls 7 and extending in an axial direction of the honeycomb structure. Predetermined through channels 9a are plugged by plugging portions 11 at one end, and the rest of through channels 9b are plugged at opposite end alternately in the checkered flag pattern in the honeycomb structure for use.

The exhaust gas flows in via one end face 3 of the filter having the honeycomb structure, the particulates included in the gas are removed, and subsequently thus purified gas flows out via the other end face 5. Concretely, the exhaust gas first flows in the through channels 9b whose ends are not plugged at the end face 3 of the filter on an inflow side and whose opposite ends are plugged at the end face 5 on an outflow side, and passes through the porous partition walls 7. The gas moves into the through channels 9a whose ends are plugged at the inlet face 3 and whose opposite ends are not plugged at the outlet face 5, and is exhausted via the through channels 9a. Moreover, at this time, the partition walls 7 acts as filter layers, and the particulates in the gas are trapped by the partition walls 7 and deposited on the partition walls 7.

After the use of this filter for a given period of time, the particulates deposited in the filter are heated by power supplied to an electric heater and burnt/removed. However, they are not completely removed, and some of the particulates remain as ashes (ash content) in the filter. Therefore, in the use over a long period of time, a filter volume substantially decreases, a pressure loss increases, and an amount of particulates which can be trapped/collected decreases, due to the deposited ashes.

Therefore, there is a problem that a frequency at which the particulates are burnt/removed as described above to carry out a regenerative treatment of the filter has to be increased.

To solve this problem, for example, an apparatus has been proposed in which the filter is held so as make the direction thereof vertical to the direction of a gas flow and a vibration apparatus is attached to the filter. The ashes which have fallen from the filter by the vibration applied to the filter by the vibration apparatus are recovered in an ash recovery section disposed below the filter (see JP-A-8-28247).

Moreover, a method has been disclosed in which a high-pressure fluid such as water is jetted onto one end of the filter to clean/remove combustion residual materials adhered onto the filter (see JP-A-2001-50028).

Furthermore, a filter has been disclosed in which one cell wall face is removed from the cell walls in the inlet or outlet face of the filter to form an opening connected to an adjacent cell between the cell walls and the plugging member (see JP-A-60-112618).

Additionally, another filter has been disclosed in which communication holes are made between the cell walls and outer wall (see JP-A-62-75803).

However, these techniques cannot bear practical use, because the opening or the communication hole is not closed with particulates during use and therefore a trapping/collecting efficiency of particulates during use is low. In order to remove the ashes from the filter, a special mechanism or apparatus is required, or the filter needs to be detached from the exhaust system of the filter. Therefore, the techniques have not been very practical.

SUMMARY OF THE INVENTION

The present invention has been developed in consideration of the conventional situations, and a major object thereof is to provide a honeycomb structure which can be used in a filter for trapping/collecting particulates included in exhaust gas and in which ashes deposited inside can be removed without requiring any special mechanism or apparatus or without detaching the filter from an exhaust system.

According to the present invention, there is provided a honeycomb structure comprising: a plurality of through channels separated by porous partition walls and extending in an axial direction of the honeycomb structure; and all of said through channels have plugging portions, respectively that plug alternately at either one end of the honeycomb structure or its opposite end in a checkered flag pattern, and wherein at least one slit per through channel is formed in the vicinity of the plugging portions of the partition walls surrounding the respective through channels (first aspect of the invention).

Moreover, according to the present invention, there is provided a method for manufacturing the honeycomb structure according to the first aspect, comprising the step of: jetting a fluid onto a honeycomb structure to form at least one slit per through channel in the vicinity of the plugging portions of the partition walls before or after firing a green honeycomb structure (second aspect of the invention).

Furthermore, according to the present invention, there is provided a method for manufacturing the honeycomb structure according to the first aspect, comprising the step of: irradiating a honeycomb structure with a laser beam to form at least one slit per through channel in the vicinity of the plugging portions of the partition walls (third aspect of the invention).

Additionally, according to the present invention, there is provided an exhaust gas purification system for trapping/collecting/removing particulate materials containing carbon as a major component in a dust-containing fluid such as exhaust gas of an internal combustion engine, the system comprising a honeycomb structure according to the first aspect of the present application, for use as a filter for trapping/collecting the particulate materials, and heating means for burning the particulate materials trapped/collected by the honeycomb structure to regenerate a filterability, wherein said at least one slit per through channel of the honeycomb structure are closed by deposition of the trapped/collected particulate materials, the slits having been closed are open by burning the particulate materials deposited with a heat at time of regeneration treatment thereof, and at least some of non-burnable materials such as ashes deposited in the honeycomb structure are discharged from the honeycomb structure by a flow of the dust-containing fluid at a time when slits are reopened (fourth aspect of the invention).

It is to be noted that in the present invention "including at least one slit per through channel" means that at least one slit is formed in any one of the partition walls surrounding one through channel.

Moreover, a "length of the slit" in the present invention denotes the length of a portion of the slit open in the through channel. For example, for the honeycomb structure of the present invention, from a viewpoint of ease of preparing, when slits 15 are formed inwards from ends of the partition walls 7 as shown in FIG. 5, the end is sometimes plugged by the plugging portion 11. In this case, a length L obtained by subtracting the length of the portion closed by the plugging portion 11 from the whole length of the slit 15 is the length of the slit. A "width of the slit" denotes a dimension W of the open portion of the slit in a direction crossing at right angles to a length direction.

DESCRIPTION OF THE PREFERRED EMBODIMENT

Figure 1:
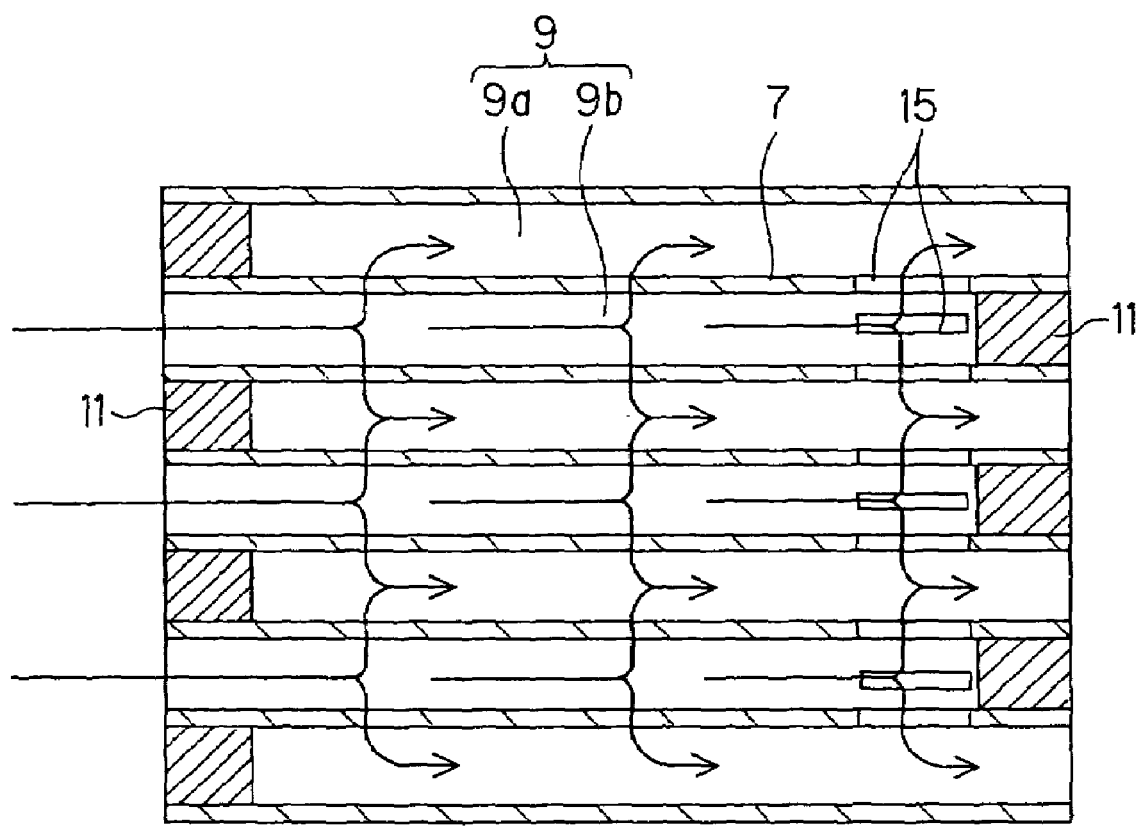
FIG. 1 is a schematic sectional view showing one example of an embodiment of a honeycomb structure according to the first aspect of the present invention.

FIG. 1 is a schematic sectional view showing one example of an embodiment of a honeycomb structure according to a first aspect of the present invention. A basic structure of the honeycomb structure according to the first aspect of the present invention includes a plurality of through channels 9 separated by porous partition walls 7 and extending in an axial direction of the honeycomb structure. Predetermined through channels 9a are plugged by plugging portions 11 at one end, and the rest of through channels 9b are plugged at the other end on a side opposite to the closed ends of the predetermined through channels 9a.

Moreover, for the honeycomb structure, as a characteristic structure, at least one slit 15 per through channel is formed in the vicinity of the plugging portion 11 of the partition wall 7 surrounding each through channel 9.

Figure 2:
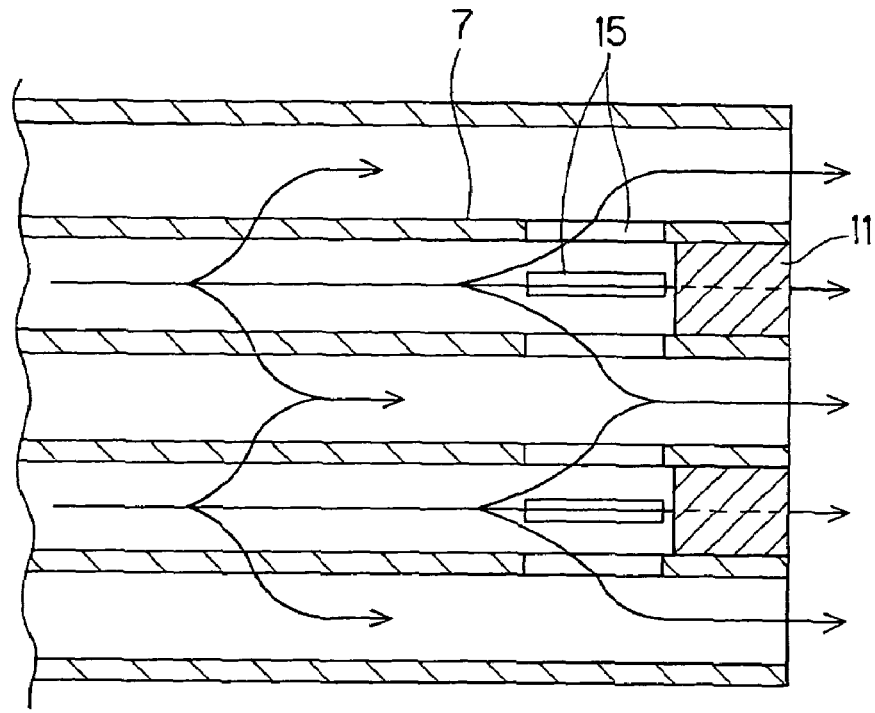
FIG. 2 is a partial sectional view showing that slits are open.
Figure 3:
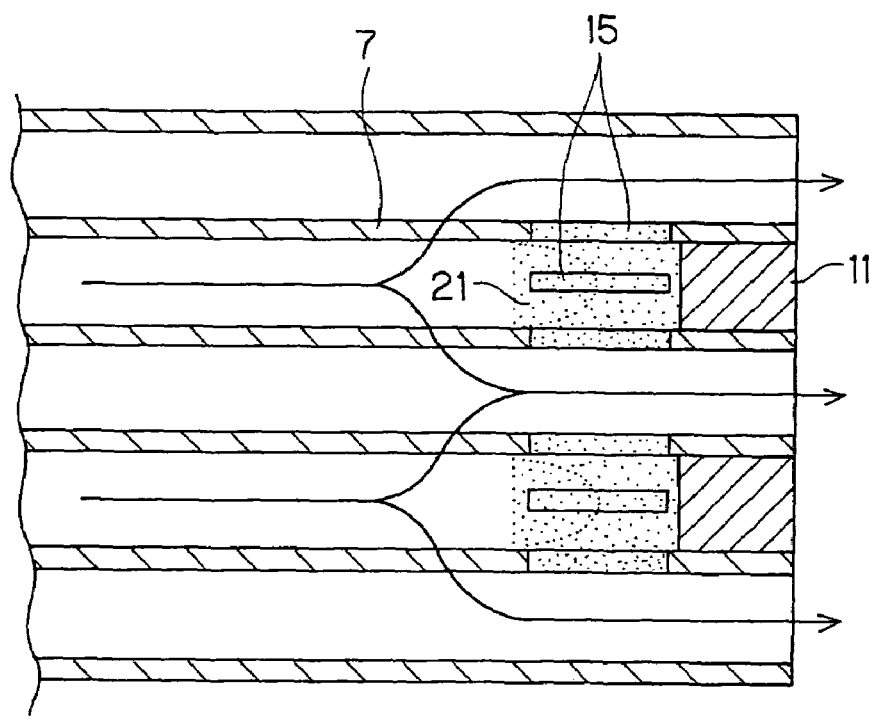
FIG. 3 is a partial sectional view in a length direction of the honeycomb structure showing that the slits are closed by particulates.
Figure 4:
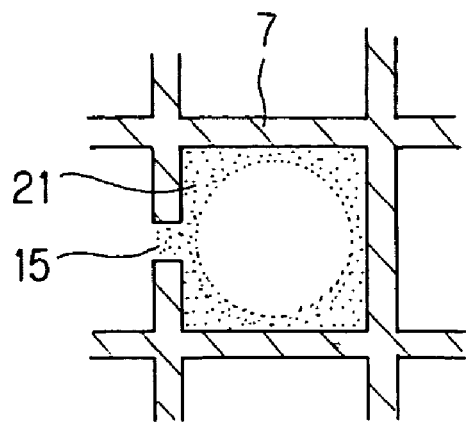
FIG. 4 is a partial sectional view in a diametric direction of the honeycomb structure showing that the slit is closed by the particulates.
Figure 5:
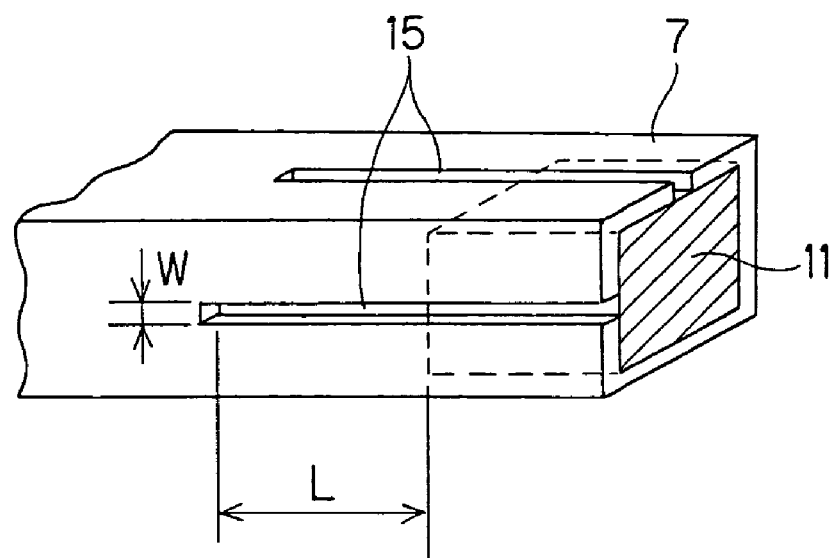
FIG. 5 is an explanatory view for defining "the length of the slit" in the present invention.

When the honeycomb structure structured in this manner is used as a filter for trapping/collecting particulates included in exhaust gas of an internal combustion engine such as diesel engine, as shown in FIG. 2, some of the particulates in the exhaust gas pass through the slits 15 in the vicinity of the plugging portions 11 immediately after use start, and therefore a trapping/collecting efficiency decreases, as compared with a conventional filter having no slits. However, as shown in FIGS. 3 and 4, the slits 15 are brought into a substantially closed state in a short time by deposition of trapped/collected particulates 21, and at and after this time, the filter attains the same degree of the trapping/collecting efficiency as that of the conventional filter.

Moreover, when a given amount of particulates 21 trapped/collected in the filter are deposited, a regenerative treatment for burning/removing the particulates 21 is carried out. By this regenerative treatment, the slits 15 having been closed by the particulates 21 return to a substantially opened state again as shown in FIG. 2.

When the slits 15 are brought into the opened state in this manner, ashes remaining in the filter are discharged to the outside via the slits 15 by the flow of the exhaust gas, and the filter returns to a clean state substantially equal to that immediately after the use start. When a series of cycle "the trapping/collecting of the particulates→the burning/removing of the particulates by the regenerative treatment→the discharge of the residual ashes" is repeated in this manner, it is possible to remove the ashes deposited inside without requiring any special mechanism or apparatus or without detaching the filter from an exhaust system.

In the first aspect of the present invention, the slit 15 per through channel are preferably linearly disposed in a direction through which the through channels 9 extend, so that the ashes are smoothly discharged when the silt is reopened. The width of the slit 15 is preferably 0.2 to 1 mm, more preferably 0.4 to 0.8 mm. A lower limit of the length of the slit 15 is preferably 1 mm, more preferably 2 mm or more. On the other hand, an upper limit of the length of the slit 15 is preferably set to be a length which is shorter between 30 mm and ½ of the length of the honeycomb structure, or more preferably a length which is shorter between 15 mm and ¼ of the length of the honeycomb structure.

When the width of the slit 15 is less than 0.2 mm, it is sometimes difficult to discharge the ashes even in the opened state of the slit 15. On the other hand, when the width of the slit 15 exceeds 1 mm, much time is required until the slits 15 are closed by the particulates 21, and a trapping/collecting efficiency for this time largely drops. When the width of the slit 15 is 0.4 mm or more, the ashes can substantially completely be discharged even at an idling run time, and this width is therefore more preferable.

For the length of the slit 15, the slit may be formed over the total length of the through channel, but from ease of processing and strength of the honeycomb structure, the length is preferably not longer than the length which is shorter between 30 mm and ½ of the length of the honeycomb structure. When the length is longer than the length, mass productivity is unsatisfactory, and the strength also has a problem. When the length of the slit 15 is not longer than the length which is shorter between 15 mm and ¼ of the length of the honeycomb structure, the strength and mass productivity are more preferably further enhanced. On the other hand, when the length of the slit 15 is less than 1 mm, it is difficult to discharge the ashes, and the length is preferably 1 mm or more. Furthermore, when the length of the slit 15 is 2 mm or more, it is more preferably possible to discharge the ashes even at the idling run time.

When the slits 15 are formed in the vicinity of the plugging portions 11 in the partition walls as described above, trapping/collecting efficiencies immediately after the use start and immediately after the regenerative treatment temporarily drop as compared with the structure including no slits. However, when the width or length of the slit 15 is within the above-described range, the slits 15 are closed in a short time by the deposition of the particulates 21. Therefore, viewing from an average trapping/collecting efficiency in the operation for a given time, a difference of the efficiency between the presence and absence of the slits 15 is slight, and there is not any practical problem.

When the honeycomb structure according to the first aspect of the present invention is used in the filter for trapping/collecting the particulates included in the exhaust gas of the internal combustion engine, the structure is usually disposed in an exhaust gas system so that a center of exhaust gas flow passes through a central portion of a section of the honeycomb structure. Therefore, as compared with a flow rate of the exhaust gas in the central portion, the flow rate of the exhaust gas flowing in the vicinity of an outer peripheral portion of the honeycomb structure tends to be retarded.

In a portion where the flow rate of the exhaust gas is low as described above, the ashes are not easily discharged as compared with the other portions. Therefore, the number of slits per through channel, and the length and width of the slit may not all be uniform, and may substantially be non-uniform in accordance with the flow rate of the exhaust gas of each portion. For example, in the above-described example, the flow rate of the exhaust gas in the vicinity of the outer peripheral portion of the honeycomb structure is retarded. Therefore, the number of slits per through channel and the length and width of the slit in the vicinity of the outer peripheral portion are preferably set to be larger than those located in the central portion from the peripheral side of the honeycomb structure, so that the ashes are easily discharged.

It is preferable to carry an oxide catalyst at least in the vicinity of the slits. By a catalyst function of the oxidation catalyst, the particulates deposited in the catalyst carrying portion burn at a temperature (e.g., about 350° C.) lower than a usual burning temperature (about 550° C.), the ashes can more easily be discharged. Examples of the preferable oxidation catalyst include Pt, Pd, Rh.

A sectional shape (cell shape) of the through channel is not especially limited, but from a viewpoint of the manufacturing, any of triangular, quadrangular, hexagonal, and circular shapes is preferable. The sectional shape of the honeycomb structure is not especially limited, and in addition to the circular shape, any shape can be used such as polygonal shapes including elliptic, oblong, oval, substantially triangular, and substantially quadrangular shapes.

For a material of the honeycomb structure, from viewpoints of strength and heat resistance, any one type selected from a group consisting of cordierite, silicon carbide, silicon nitride, alumina, mullite, and lithium aluminum silicate (LAS) is preferably used as a major crystal phase. The material of the plugging portion is preferably the same as that of the honeycomb structure, because both coefficients of thermal expansion agree with each other.

The application of the honeycomb structure according to the first aspect of the present invention is not especially limited, but as described above, it is most preferable to use the structure as the filter in which the partition walls for separating the through channels have filterabilities to trap/collect/remove the particulates (particulate materials) included in the dust-containing fluid such as the exhaust gas of the internal combustion engine, because characteristics of the structure can be fulfilled.

Next, a manufacturing method of the honeycomb structure according to the present invention will be described noting the forming of the slits which are characteristic portions of the honeycomb structure.

In the manufacturing method according to a second aspect of the present invention, in steps of forming the slits in the vicinity of the plugging portions of the partition walls, a fluid is sprayed onto the honeycomb structure which is a non-calcined ceramic molded member or calcined ceramic member, and portions of the partition walls in which the slits are to be formed are shaved off by the fluid to form the slits. For the fluid, any of compressed air, water vapor, and water is preferably used.

According to a third aspect of the present invention, in the steps of forming the slits in the vicinity of the plugging portions of the partition walls, the honeycomb structure which is the non-calcined ceramic molded member or calcined ceramic member is irradiated with laser to burn/lose the portions of the partition walls in which the slits are to be formed, so that the slits are formed.

It is to be noted that in addition to the above-described methods, various manufacturing methods are considered, but the above-described methods are preferable from viewpoints of ease of forming the slits and economical efficiency.

An exhaust gas purification system according to a fourth aspect of the present invention is constituted using the honeycomb structure according to the first aspect of the present invention, and is used for a purpose of trapping/collecting/removing the particulates (particulate materials) containing the major component of carbon included in the dust-containing fluid such as the exhaust gas of the internal combustion engine. This system includes the honeycomb structure for use as the filter for trapping/collecting the particulates according to the first aspect of the present invention, and heating means for burning the particulates trapped/collected by the honeycomb structure to regenerate a filterability.

In this system, the slits of the honeycomb structure are substantially closed by the deposition of the particulates with the trapping/collecting. When the particulates are burnt by the heating at a regeneration time, the closed slits are substantially opened. When the slits are opened, at least some of non-burnt materials such as ashes deposited in the honeycomb structure are discharged from the honeycomb structure by the flow of the dust-containing fluid.

As the heating means of the system, any of an electric heater, a burner using a gas or liquid fuel, a microwave generation apparatus, and heating means for discharging non-burnt fuel components in the exhaust gas of the internal combustion engine and burning the non-burnt fuel components by catalyst reaction to raise an exhaust gas temperature is preferably used.

EXAMPLES

The present invention will be described hereinafter in more detail based on examples, but the present invention is not limited to these examples.

[Changes of Pressure Loss by Operation Time]

Figure 6A:
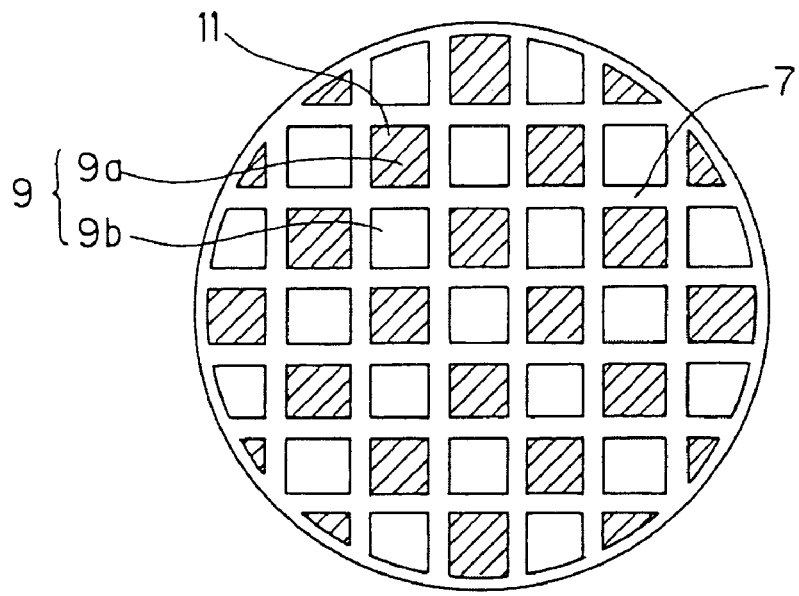
FIGS. 6(a) and (b) are a schematic explanatory view showing a basic structure of the honeycomb structure for use as a conventional filter, (a) is a plan view seen from one end face, and (b) is a sectional view.
Figure 6B:
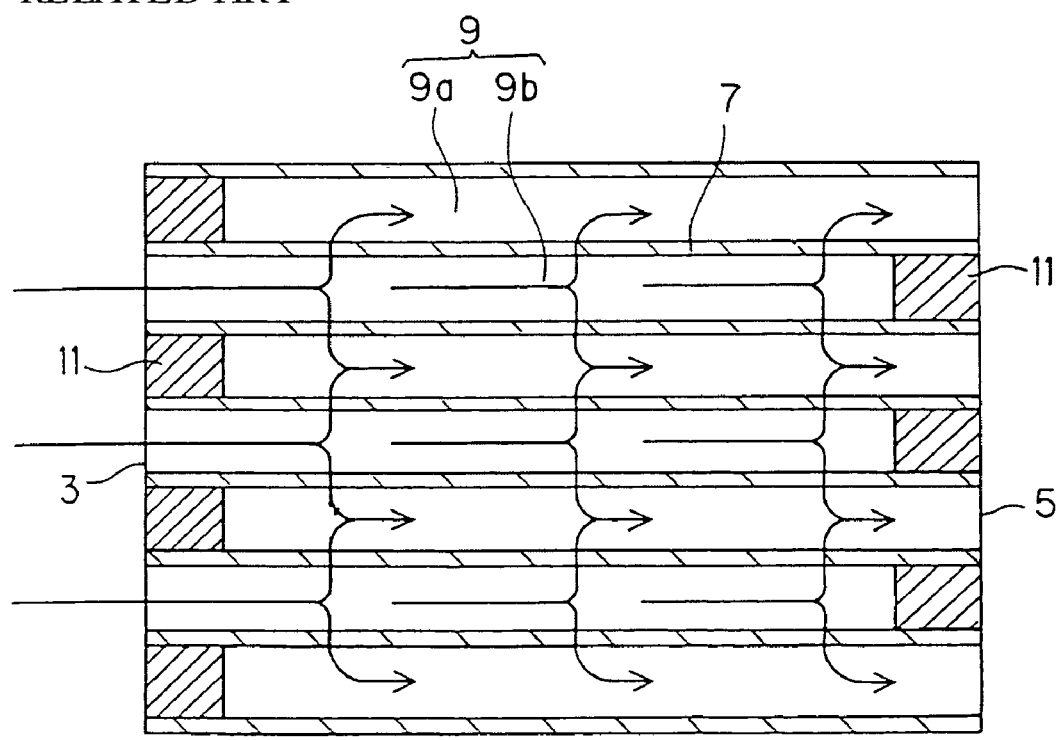

The honeycomb structure having a diameter of 144 mm, length of 152 mm, partition wall thickness of 0.3 mm, and cell density of 46/cm$^2$ was used to prepare a diesel particulate filter (DPF) including a conventional structure in which one end of each through channel was plugged by the plugging portion as shown in FIGS. 6(a) or (b).

The DPF was mounted in the exhaust system of a common rail type direct-injection in-line four-cylinder diesel engine having a displacement of 2000 cc to repeatedly carry out the trapping/collecting of the particulates and the regenerating. It is to be noted that in the regeneration of the DPF, the fuel injected into an engine combustion chamber by post injection is burnt by a honeycomb oxidation catalyst disposed in DPF upstream, and the particulates deposited in the DPF are burnt by a generated heat.

Figure 7:
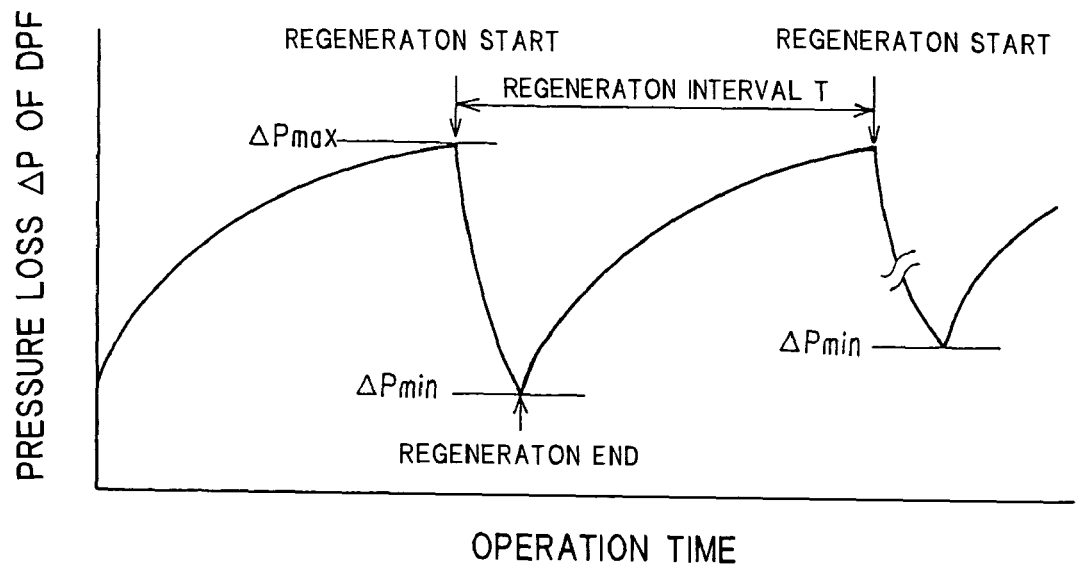
FIG. 7 is a graph showing changes of a pressure loss of DPF by an operation time in a case where the trapping/collecting of the particulates and regeneration are repeatedly carried out.

FIG. 7 shows changes of a pressure loss of DPF by an operation time in a case where the trapping/collecting of the particulates and regeneration are repeatedly carried out. First, with an elapse of the operation time (with the trapping/collecting of the particulates), the pressure loss of the DPF rose and reached preset $\Delta P_{max}$, and the regeneration of the DPF was then started. The regeneration was ended after a given time. At this time, the pressure loss dropped to $\Delta P_{min}$. Thereafter, the trapping/collecting of the particulates was resumed.

When this trapping/collecting and regeneration step is repeated, and if the DPF is constantly completely regenerated at the regeneration time, $\Delta P_{min}$ does not change. However, in the DPF including the conventional structure, $\Delta P_{min}$ gradually rises by the deposition of a non-burnt content by the use over a long period. By the increase of $\Delta P_{min}$, a period between the existing and next regenerations (regeneration interval=T) gradually shortens, and a necessity for frequent regeneration occurs. As a result, there occur problems such as acceleration of deterioration of a regeneration system, deterioration of use convenience by restrictions on operation conditions at the regeneration time, and deterioration of fuel cost involved in the regeneration. In the operation at a constant regeneration interval, since both $\Delta P_{min}$ and $\Delta P_{max}$ rise, engine capabilities are lowered.

[Presence/Absence of Slits and Trapping/Collecting Efficiency]

In the same manner as the DPF (the slits were not formed) including the conventional structure in which the honeycomb structure having the diameter of 144 mm, length of 152 mm, partition wall thickness of 0.3 mm, and cell density of 46/cm$^2$ was used to plug one end of each through channel by the plugging portion as shown in FIGS. 6(a) or (b), a DPF according to the present invention was prepared in which one end of each through channel was plugged. Moreover, the slits were formed in the vicinity of the plugging portions of the partition walls surrounding the respective through channels as shown in FIG. 1.

In the same manner as described above, each of these two DPFs was mounted in the exhaust system of the common rail type direct-injection diesel engine to trap/collect the particulates, and the changes of the trapping/collecting efficiency with the elapse of the operation time were checked. It is to be noted that a part of the exhaust gas is sucked and passes through filter paper in upstream and downstream of the DPF, a soot mass in the exhaust gas attached onto the filter paper is measured, and the trapping/collecting efficiency is obtained from the following equation.

Trapping/collecting efficiency (%)={1−(soot mass in DPF downstream)/(soot mass in DPF upstream)}×100  [Equation 1]

Figure 8:
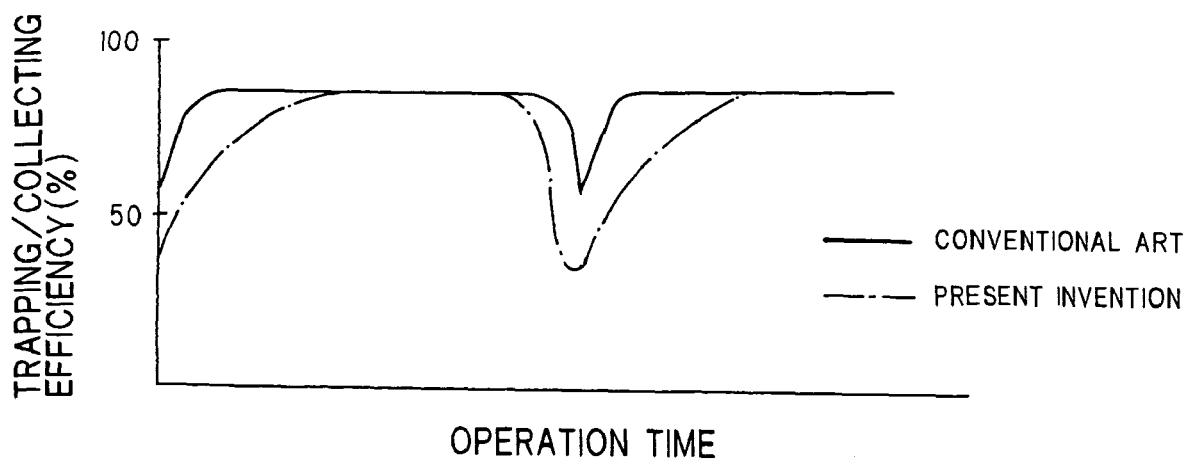
FIG. 8 is a graph showing changes of a trapping/collecting efficiency with an elapse of the operation time.

Results are as shown in FIG. 8. Even in the DPF including the conventional structure in which the slits are not formed in the vicinity of the plugging portions of the partition walls surrounding the respective through channels, the trapping/collecting efficiency immediately after particulate trapping/collecting start is low, the trapped/collected amount increases with the elapse of time, and the trapping/collecting efficiency shows a tendency to rise. On the other hand, in the DPF according to the present invention in which the slits are formed in the vicinity of the plugging portions of the partition walls surrounding the respective through channels, the exhaust gas flows out of the slits as such. Therefore, the trapping/collecting efficiency immediately after the trapping/collecting start is lower than that of the DPF including the conventional structure. When the slits are closed by the deposition of the particulates, the trapping/collecting efficiency moderately rises, the slits are completely closed, and the trapping/collecting efficiency equal to that of the conventional DPF is shown.

[Width of Slit and Trapping/Collecting Efficiency]

The honeycomb structure having the diameter of 144 mm, length of 152 mm, partition wall thickness of 0.43 mm, and cell density of 16/cm$^2$ was used to prepare the DPF in which one end of each through channel was plugged by the plugging portion and one slit having a length of 10 mm and various widths of 0 mm (without any through-slit) to 1.2 mm was formed per through channel in the vicinity of the plugging portion of the partition wall surrounding each through channel.

Each of the DPFs was mounted in the exhaust system of the common rail type direct-injection diesel engine in the same manner as described above, and the particulates were trapped/collected to check a relation between the width of the slit and the trapping/collecting efficiency in the given operation time.

Figure 9:
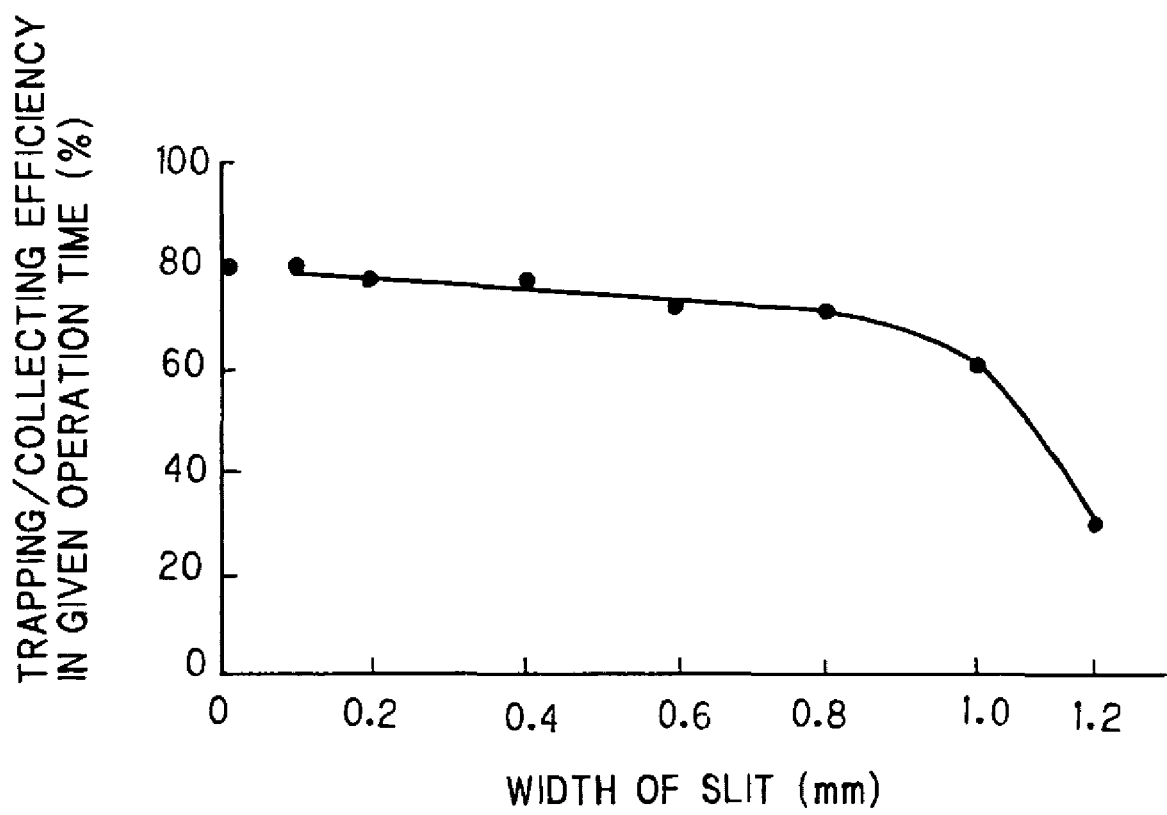
FIG. 9 is a graph showing a relation between a width of the slit formed in the vicinity of a plugging portion of a partition wall surrounding each through channel and the trapping/collecting efficiency in a given operation time.

The results are shown in FIG. 9. With the increase of the width of the slit, the trapping/collecting efficiency gradually drops. However, even with the slit width of 0.8 mm, a sufficient trapping/collecting efficiency of 70% is shown (It is to be noted that without any slit (slit width of 0 mm) the efficiency is 80%). When the width of the slit exceeds 0.8 mm, the trapping/collecting efficiency starts to largely drop, but in this region the efficiency is 60% even with the slit width of 1 mm, and the region is practically usable. When the width of the slit exceeds 1 mm, much time is required until the slit is closed by the deposition of the particulates, the trapping/collecting efficiency largely drops, and the region is not practical.

Moreover, when the width of the slit is less than 0.2 mm, the ashes are not discharged well in some case. Therefore, the width is preferably set to 0.2 mm or more. However, when the width of the slit is less than 0.4 mm, the discharge of the ashes sometimes becomes incomplete in a low-speed operation at 1000 rpm or less. On the other hand, when the width of the slit is 0.4 mm or more, the ashes are substantially completely discharged even at the idling run time, and therefore this width is more preferable.

From the above, it can be said that the width of the slit is preferably in a range of 0.2 to 1 mm, and more preferably in a range of 0.4 to 0.8 mm.

[Changes of Pressure Loss in Long-Time Use]

In the same manner as the DPF (the slits were not formed) including the conventional structure in which the honeycomb structure having the diameter of 144 mm, length of 152 mm, partition wall thickness of 0.38 mm, and cell density of 23/cm$^2$ was used to plug one end of each through channel by the plugging portion as shown in FIGS. 6(a) or (b), DPFs (four types including the widths of slits of 0.2 mm, 0.4 mm, 0.8 mm, 1.0 mm) according to the present invention were prepared in which one end of each through channel was plugged by the plugging portion. Moreover, the slits were formed in the vicinity of the plugging portions of the partition walls surrounding the respective through channels as shown in FIG. 1.

In the same manner as described above, each of these two DPFs was mounted in the exhaust system of the common rail type direct-injection diesel engine to repeatedly carry out the trapping/collecting of the particulates and the regeneration, and the changes of the pressure loss in a long-time use. It is to be noted that for the trapping/collecting and the regenerating, 7.5 g of particulates are trapped/collected and the regenerating is carried out in one cycle. This was carried out for 500 cycles.

For the DPF including the conventional structure in which the slits were not formed in the vicinity of the plugging portions of the partition walls surrounding the through channels, the pressure loss gradually rose, and a pressure loss of 1.3 times that at a test start time was indicated after 500 cycles. After the test ended, the deposition of the ashes which were non-burnt components in the particulates was recognized inside the DPF. On the other hand, for the DPF according to the present invention in which the slits were formed in the vicinity of the plugging portions of the partition walls surrounding the respective through channels, with any of the widths of slits of 0.2 mm, 0.4 mm, 0.8 mm, and 1.0 mm, after 500 cycles, the same pressure loss and trapping/collecting efficiency as those at the test start time were obtained. After the test ended, there was not any deposition of the non-burnt components in the particulates inside the DPF.

[Manufacturing Method]

In the manufacturing of the honeycomb structure according to the present invention, in the steps of forming at least one slit per through channel in the vicinity of the plugging portions of the partition walls surrounding the respective through channels, satisfactory results were obtained even with the use of any of the manufacturing methods according to the second and third aspects of the present invention.

As described above, when the honeycomb structure of the present invention is used as the filter for trapping/collecting the particulates included in the exhaust gas of the internal combustion engine such as the diesel engine, it is possible to remove the ashes deposited inside without requiring any special mechanism or apparatus as in the related art or without detaching the filter from the exhaust system. According to the manufacturing method of the present invention, the above-described honeycomb structure can easily and economically be prepared. Furthermore, in the exhaust gas purification system of the present invention, since the honeycomb structure is used as the filter, the ashes deposited inside the filter can easily be removed.

What is claimed is:

1. A honeycomb structure comprising:
   a plurality of through channels separated by porous partition walls and extending in an axial direction of the honeycomb structure,
   wherein all of said through channels have plugging portions, respectively that plug alternately at either one end of the honeycomb structure or its opposite end in a checkered flag pattern, and
   wherein at least one slit per through channel is formed only in the vicinity of the plugging portion of the partition walls surrounding the respective through channels, wherein a width of each slit is in a range from 0.2 to 1 mm, and a length of each slit is from 1 mm to a length which is the shorter of (a)30 mm and (b) ½ of a length of the honeycomb structure.

2. The honeycomb structure according to claim 1, wherein said at least one slit is linearly formed in an axial direction to which the through channels extend.

3. The honeycomb structure according to claim 1, wherein a width of each slit is in a range of from 0.4 to 0.8 mm, and a length of each slit is from 2 mm to a length which is the shorter of (a) 15 mm or (b) ¼ of a length of the honeycomb structure.

4. The honeycomb structure according to claim 1, wherein the number of slits per through channel in the vicinity of an outer peripheral portion is larger than that located in a central portion from a peripheral side of the honeycomb structure.

5. The honeycomb structure according to claim 1, wherein the length of the slit in the vicinity of the outer peripheral portion is longer than that located in a central portion from a peripheral side of the honeycomb structure.

6. The honeycomb structure according to claim 1, wherein the width of the slit in the vicinity of the outer peripheral portion is wider than that located in a central portion from a peripheral side of the honeycomb structure.

7. The honeycomb structure according to claim 1, wherein the width of the slits varies from slit to slit.

8. The honeycomb structure according to claim 1, wherein an oxidation catalyst is carried on at least in the vicinity of the slits.

9. The honeycomb structure according to claim 1, whose partition walls have filterability,
   wherein the honeycomb structure, when used as a filter, filters particulate materials included in a dust-containing fluid.

10. The honeycomb structure according to claim 1, wherein a sectional shape of the through channel is one of triangular, quadrangular, hexagonal, or circular.

11. The honeycomb structure according to claim 1, wherein a major crystal phase of the honeycomb structure is made of one of cordierite, silicon carbide, silicon nitride, alumina, mullite, or lithium aluminum silicate (LAS).

12. A method for manufacturing a honeycomb structure comprising a plurality of through channels separated by porous partition walls and extending in an axial direction of the honeycomb structure, wherein all of said through channels have plugging portions, respectively that plug alternately at either one end of the honeycomb structure or at an opposite end of the honeycomb structure in a checkered flag pattern, wherein at least one slit per through channel is formed only in the vicinity of the plugging portion of the partition walls surrounding the respective through channels, and wherein a width of each slit is in a range from 0.2 to 1 mm, and a length of each slit is from 1 mm to a length which is the shorter of (a) 30 mm and (b) ½ of a length of the honeycomb structure which method comprises the step of:
   jetting a fluid onto a honeycomb structure to form at least one slit per through channel only in the vicinity of the plugging portions of the partition walls before or after firing a green honeycomb structure.

13. The method according to claim 12, wherein the fluid is one of compressed air, water vapor, or water.

14. A method for manufacturing a honeycomb structure comprising a plurality of through channels separated by porous partition walls and extending in an axial direction of the honeycomb structure, wherein all of said through channels have plugging portions, respectively that plug alternately at either one end of the honeycomb structure or its opposite end in a checkered flag pattern, wherein at least one slit per through channel is formed only in the vicinity of the plugging portion of the partition walls surrounding the respective through channels, and wherein a width of each slit is in a range from 0.2 to 1 mm, and a length of each slit is from 1 mm to a length which is the shorter of (a) 30 mm and (b) ½ of a length of the honeycomb structure, which method comprises the step of:

irradiating a honeycomb structure with a laser beam to form at least one slit per through channel only in the vicinity of the plugging portions of the partition walls.

15. An exhaust gas purification system for filtering particulate materials containing carbon as a major component in a dust-containing fluid, the system comprising:

a honeycomb structure comprising a plurality of through channels separated by porous partition walls and extending in an axial direction of the honeycomb structure, wherein all of said through channels have plugging portions, respectively that plug alternately at either one end of the honeycomb structure or its opposite end in a checkered flag pattern, and wherein at least one slit per through channel is formed only in the vicinity of the plugging portion of the partition walls surrounding the respective through channels, for use as a filter for filtering the particulate materials, wherein a width of each slit is in a range from 0.2 to 1 mm, and a length of each slit is from 1 mm to a length which is the shorter of (a) 30 mm and (b) ½ of a length of the honeycomb structure; and heating means for burning the particulate materials filtered by the honeycomb structure to regenerate a filterability, wherein said at least one slit per through channel of the honeycomb structure are closed by deposition of the filtered particulate materials, the slits having been closed are open by burning the particulate materials deposited with a heat at time of regeneration treatment thereof, and at least some of non-burnable materials deposited in the honeycomb structure are discharged from the honeycomb structure by a flow of the dust-containing fluid at a time when slits are reopened.

16. The exhaust gas purification system according to claim 15, wherein the heating means is one of an electric heater, a burner using a gas or liquid fuel, a microwave generation apparatus, or heating means for raising an exhaust gas temperature by burning discharged non-burnt fuel components in the exhaust gas of an internal combustion engine with an aid of a catalyst reaction.

17. The honeycomb structure according to claim 9, wherein the dust-containing fluid is an exhaust gas of an internal combustion engine in communication with the honeycomb structure.

18. The honeycomb structure according to claim 15, wherein the dust-containing fluid is an exhaust gas of an internal combustion engine in communication with the honeycomb structure.

19. An exhaust gas purification system according to claim 15, wherein the non-burnable materials are ashes.

20. The honeycomb structure according to claim 1, wherein the slits are constructed and arranged to accommodate effective discharge of ashes by flow of exhaust gas.

* * * * *